C. A. BRINK.
INDICATOR AND STOP DEVICE.
APPLICATION FILED AUG. 19, 1907.

1,021,820.

Patented Apr. 2, 1912.
5 SHEETS—SHEET 1.

WITNESSES;

INVENTOR
Carl A. Brink
BY
ATTORNEYS

C. A. BRINK.
INDICATOR AND STOP DEVICE.
APPLICATION FILED AUG. 19, 1907.

1,021,820.

Patented Apr. 2, 1912.

C. A. BRINK.
INDICATOR AND STOP DEVICE.
APPLICATION FILED AUG. 19, 1907.

1,021,820.

Patented Apr. 2, 1912.
5 SHEETS—SHEET 4.

WITNESSES
B. M. Smith
J. J. McCarthy

INVENTOR
Carl A. Brink
BY Freter Freeman Watson & Cort
ATTORNEYS

UNITED STATES PATENT OFFICE.

CARL A. BRINK, OF BAY SPRING, RHODE ISLAND.

INDICATOR AND STOP DEVICE.

1,021,820.	Specification of Letters Patent.	Patented Apr. 2, 1912.

Application filed August 19, 1907. Serial No. 389,271.

*To all whom it may concern:*

Be it known that I, CARL A. BRINK, a citizen of the United States, residing at Bay Spring, in the county of Bristol and State of Rhode Island, have invented certain new and useful Improvements in Indicator and Stop Devices, of which the following is a specification.

My invention relates to registering and stopping apparatus for registering the number of movements or operations performed by a machine and for automatically stopping said machine at a predetermined time.

The purpose of my invention is to produce an accurate device capable of high speed operation, convenient to adjust and absolute in its control of the stopping mechanism.

Figures 1, 2, 8:
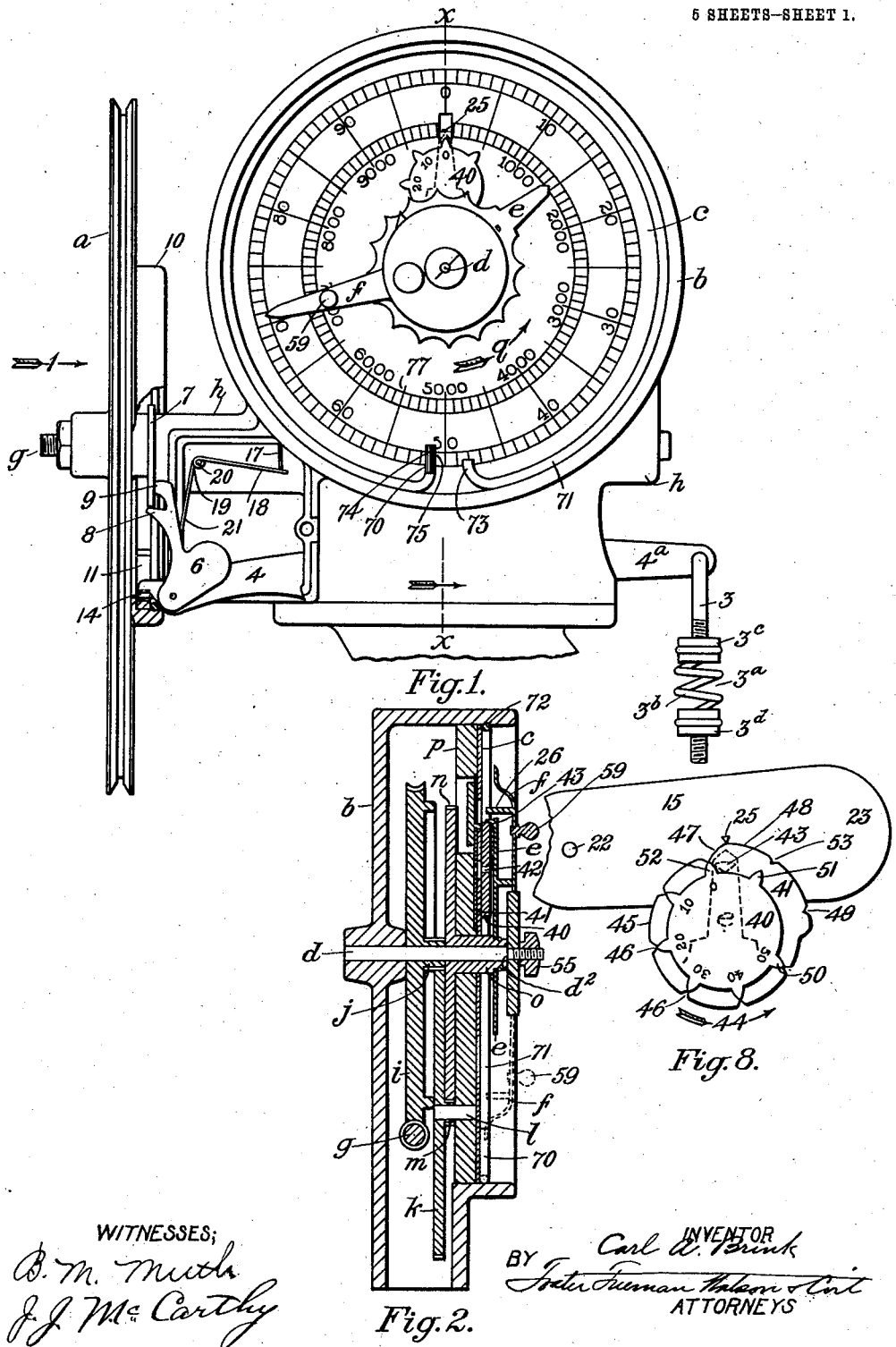
Figure 3:
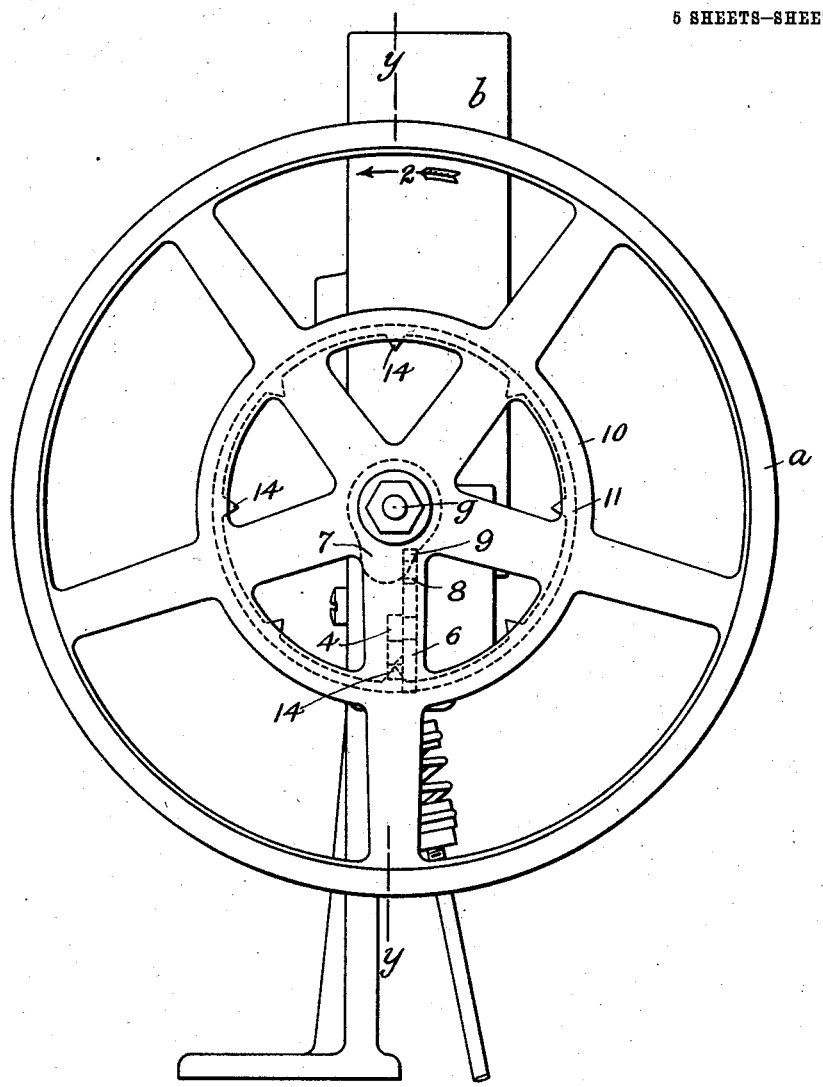
Figure 4:
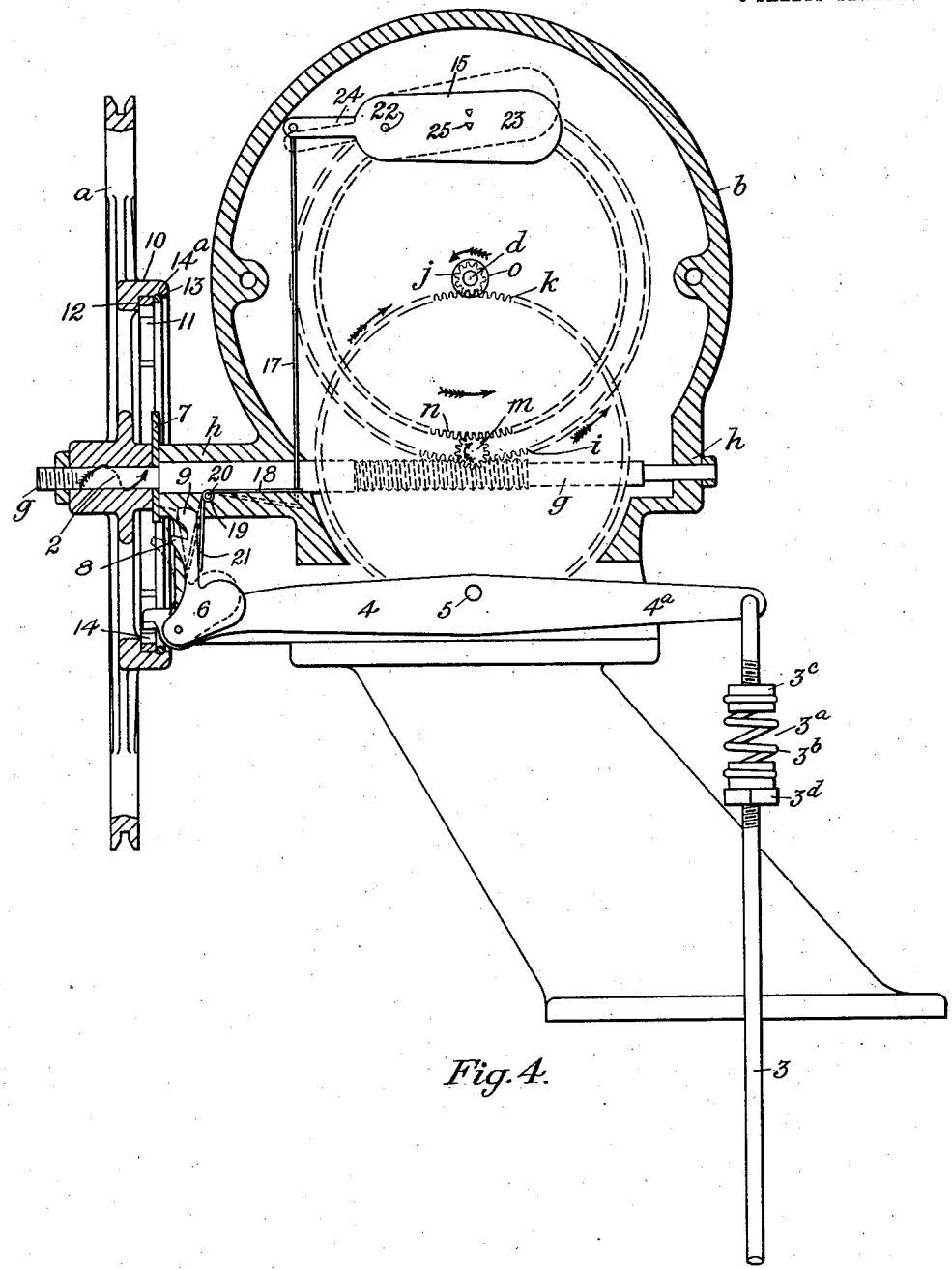
Figure 5:
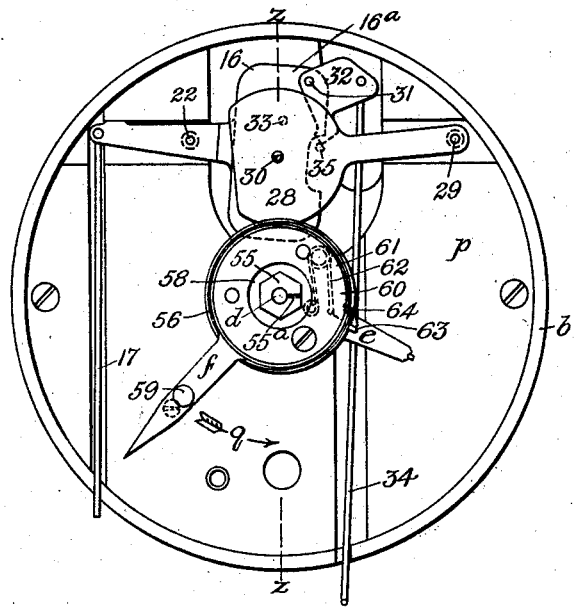
Figure 6:
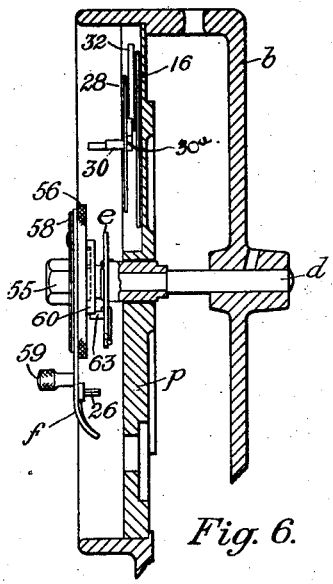
Figure 9:
Figure 10:
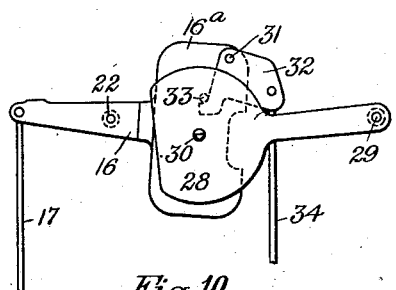
Figure 7:
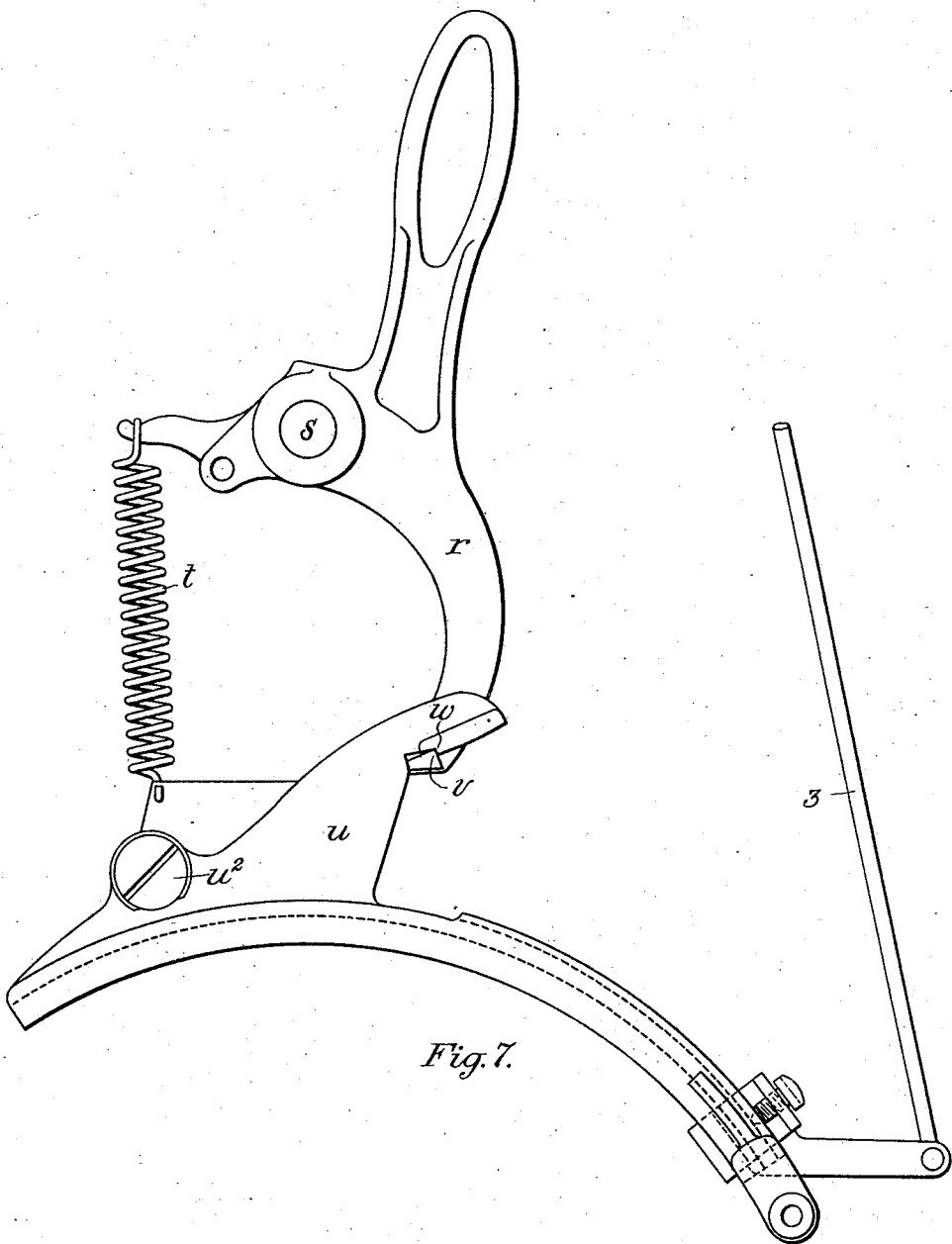

My invention is fully set forth in the following, illustrated by the accompanying drawings, in which:

Figure 1 is a front elevation of the device; Fig. 2, a sectional view on the line $x$—$x$, Fig. 1; Fig. 3, a side elevation looking in the direction indicated by the arrow 1 Fig. 1; Fig. 4, a sectional elevation on the line $y$—$y$ of Fig. 3; Fig. 5 a detail view showing the hand or index arrangements and the preferred construction for multiplying the registering capacity of the apparatus; Fig. 6, a sectional view on the line $z$—$z$ of Fig. 5; Fig. 7, a view of a machine stopping and starting control mechanism; Fig. 8 is a detail of Fig. 1 showing an alternative construction of the register multiplying mechanism; Fig. 9 is a detail of the hand setting pawl; Fig. 10 is a detail of the preferred construction for the register multiplying mechanism.

My invention is adapted for use as a measuring device for measuring yardage, or for any similar purpose to which an indicating device is usually applied.

The apparatus has what I term an "operating member" $a$ shown as a wheel, that is, a member to which motion is imparted by or from the part or thing to be turned or measured, and which may be part of the apparatus or part of a machine with which the apparatus is used; registering means which will indicate the number or extent of movements of said member, and stop control means which are adapted to operate the stop devices of the machine with which the apparatus is to be used so as to arrest the action of said machine after a predetermined number of movements of the member $a$.

I have illustrated the invention as arranged for measuring thread, yarn or similar material, and have shown the device applied to the stop device of a winding machine.

The case $b$ which supports and incloses the working parts of the device is formed with a circular upper portion in the front of which is the dial or face $c$ of the registering means. At the center of the dial is a stud $d$ adapted to turn in a bearing in the back of the case $b$ and extending through the dial to support the indicators or hands $e$ and $f$.

Turning in bearings $h$—$h$ at the bottom of the case $b$ is a horizontal shaft $g$ driven from the wheel $a$ and arranged at right angles to the stud $d$, and formed with a worm thread midway its bearings, adapted to engage the teeth of a worm wheel or gear $i$ which is fast on the stud $d$. The worm gear $i$ has a pinion $j$ preferably formed on its hub or fastened thereto and engaging the teeth of a gear $k$ rotating on the stud $l$, which gear has a pinion $m$ that engages the gear $n$. The hub $o$ of the gear $n$ extends through the dial $c$, having a bearing in the plate $p$ to which the dial is secured, and at its outer end carries the short hand $e$. The long hand $f$ is carried by the shaft $d$, and both hands are secured frictionally so that while being normally turned by the shaft $d$ and hub $o$, they may be manually turned independently of their driving connections to set the hands as afterward described.

The shaft $g$ operates the indicator pointers or hands $e$ and $f$, as explained, and is itself driven by suitable connections with the said going member. As here illustrated, I have preferred to show the device operated by a thread, tape, wire or other material passed over the wheel $a$ as it leads to the winding spindle of the machine. The wheel $a$ is preferably grooved to receive the thread which is given one or more turns on its periphery to insure a positive frictional contact. The periphery is of a determined circumference to measure a certain length of material. Each rotation of the wheel caused by the feeding of the material will move the hands a certain part of a revolution, and the dial $c$ is suitably divided and spaced to indicate the number of rotations of the wheel and thus the number of linear units of material passing over the wheel. For instance, for convenience in size the wheel is made to measure eighteen inches in circumference, so that two rotations will measure thirty-six inches or one yard of material. The circumference of the dial is divided into one hundred spaces and the ratio of the worm to the worm gear is such that two rotations of the measuring wheel moves the long hand $f$ one space, so that each space indicates one yard and a complete rotation of the long hand one hundred yards. The gearing between the shaft $d$ and the short hand $e$ is so proportioned that the short hand moves one space for every complete revolution of the long hand, so that one revolution of the short hand is completed after the long hand has made one hundred revolutions, thus indicating ten thousand yards. For convenience in reading, the dial is preferably graduated on two circles of different diameter, the outside circle being the path of the point of the long or units hand $f$, and the inner circle the path of the end of the short or hundreds hand $e$. The outer circle is marked at every ten graduations—0, 10, 20, 30, etc., up to 90, and the inner circle is marked at corresponding graduations—0, 1000, 2000, up to 9000. The stop device which controls the operation of the machine with which the apparatus coöperates is actuated by the hands upon their both reaching the zero point. The parts are preferably arranged so that the hands may be set to indicate the desired number of operations of the machine to be performed before stopping it, and the shaft $g$ is then rotated in the direction indicated by the arrow 2, so that the hands $e$ and $f$ are turned backward on the dial until they both reach the zero point.

The stop device for the machine with which my improved apparatus coöperates may be of any suitable character and arrangement. Fig. 7 shows a usual and well known form of stop device for a winding machine, in which the starting lever $r$ is fastened to a rock-shaft $s$ adapted to be actuated by the spring $t$ to control the engagement of the clutch devices. The lever $r$ is shown in position to cause the operation of the machine, being retained by a locking device consisting of an arm or lever $u$ formed with a detent $v$ adapted to engage the corresponding detent $w$ on the lower arm of the lever $r$. The arm $u$ is pivoted at $u^2$ to adapt its opposite end to be raised to release the detents $v$ and $w$, thereby freeing the lever $r$ and allowing the shaft $s$ to rock under influence of the spring $t$ to throw the clutch or other device and cause the stopping of the machine.

The apparatus is provided with suitable means constituting a stop controller or control device from which is operated the stop device of the machine with which the apparatus coöperates. As shown the stop control device is a controller lever 4 to which the arm $u$ may be connected by a rod 3, which lever 4 is pivoted at 5 in the bottom of the case $b$, see Fig. 4. Preferably this connection is made through a turnbuckle $3^a$ which I have shown formed of a coiled wire spring $3^b$ with nut portions $3^c$ and $3^d$ at either end. The spring serves as a yielding element to provide for abnormal strain between the connections. The stop controller is operated by the following described means: At the opposite end of the controller lever 4 is hinged a pawl 6 adapted to be thrown into engagement with an element 7, preferably a cam, moving with the wheel $a$. (See Fig. 3.) The cam 7 is formed on or fastened to the hub of the wheel $a$ and is adapted to engage the shoulder 8 on the pawl 6 when the latter is thrown into the position indicated by the dotted lines, Fig. 4. The upper projection 9 of the pawl is adapted to engage the side of the cam to prevent the pawl from being thrown too far. The engagement of the edge of the cam 7 with the shoulder on the pawl 6 throws the pawl 6 downward and tilts the lever 4, thereby raising the arm $u$ and causing the stopping of the machine.

To prevent the wheel $a$ from overrunning after the machine is stopped, I provide the novel brake mechanism now described. A rim or flange 10 is formed on the inner side of the wheel $a$, and on the interior of this flange is arranged a friction ring 11, retained in the flange against a shoulder 12 by the spring-ring 13 sprung into the groove $14^a$ in the flange 10. The ring 11 is formed with a plurality of inwardly projecting teeth or stops 14—see Fig. 3—adapted to be engaged by the end of the lever 4 when the latter is forced downward by the engagement of the pawl 6 with the cam 7. Normally the end of the lever 4 is raised above the path of the teeth 14, as shown in Fig. 3 and Fig. 4, but when forced downward, as shown in Fig. 1, it will engage one of the teeth 14 to prevent the rotation of the ring 11, and through the frictional contact of the ring with the wheel $a$, the rotation of the wheel is arrested without shock or jar.

The lever 4 is operated from a lever 15, Fig. 4, or from a lever 16, Fig. 5, the latter being the preferable arrangement, shown further in Fig. 10. A wire 17 extends downward from the lever 15 or 16, and its end is adapted to contact with one arm 18 of a bell-crank lever 19, pivoted at 20, see Fig. 4. The lever 15 or 16 is normally in a position with the wire 17 raised owing to the weight of the opposite arm of the lever. The lower arm 21 of the bell crank lever 19 engages the upper arm of the pawl 6 to throw the latter into engagement with the cam 7, and it is preferable to form the lever 19 of spring wire so that if the pawl 6 should be acted upon at a point when the cam 7 is in its lowermost position, and therefore be prevented from its full movement, the bell crank lever 19 can yield to allow the positive movement of the wire 17. The lever 15 is pivoted at 22 and is operated through the units hand $f$ to lift the arm 23, thereby depressing the arm 24 to cause the wire 17 to tilt the pawl 6. It will be evident that, if the units hand operated on the lever 15 at each revolution, the device would stop the machine at every one hundred units measured, but it is desirable to provide for a greater range of action. To this end the device is preferably arranged so that the units hand will not actuate the lever 15 until the hundreds hand is at the zero point, this being accomplished by arranging the lever 15 so that, normally, it is out of the range of the units hand but is moved into position to be engaged thereby by the hundreds hand. For instance, the lever 15 might be formed with the projection 25, preferably beveled on its lower edges and adapted to be engaged by an oppositely beveled projection 26 on the units hand, see Fig. 6. The lever 15 would then be normally so positioned that the projection 26 would pass above and clear the projection 25 when the units hand moved past it, but the hundreds hand, upon reaching the zero point, would engage and lift the projection 25 into position to be operated upon by the projection 26. It will be understood that the raising of the arm 23 of the lever 15 by the hundreds hand would not be sufficient to tilt the pawl far enough to engage the cam 7, but the further movement of the lever 15 by the units hand would throw the pawl clear out to act to cause the stopping of the machine as before described.

With the arrangement above described, the counter would be capable of measuring ten thousand units before stopping the machine, but it is sometimes required to measure even a greater number of operations than this, and to further extend the scope of the device I provide the novel means now described.

As shown in Fig. 5, the lever 16 is not engaged directly by the hands $e$ and $f$ but is controlled through intermediary means adapted to be set by the hundreds hand and afterward operated by the units hand. An auxiliary lever 28 is pivoted at 29, and carries the beveled projection 30 adapted to be engaged first by the extremity of the hundreds hand $e$ and afterward by the projection 26 on the units hand $f$. Pivoted at 31 on the lever 16 is a pawl or latch 32 which normally contacts with the pin 33 projecting from the lever 16, as shown in Fig. 10. Depending from the outer arm of the latch 32 is a wire 34 projecting through an opening in the under side of the case $b$. Projecting from the plate $p$ is a pin 35 adapted to engage and set the latch 32 when the latter is raised to the position indicated in Fig. 5.

If it is desired to set the indicator to register more than ten thousand units before stopping the machine, the wire 34 is moved upward to set the latch 32 as indicated in Fig. 5. Now, when the hundreds hand reaches the zero point, it will engage and lift the projection 30 into position to be engaged by the projection 26 on the units hand, which, in turn, will lift the projection 30 sufficiently for its rearwardly extending portion 30$^a$ (see Fig. 6) to engage the pin 33. This latter engagement lifts the lever 16 very slightly (not enough to throw the pawl 6 into engagement with its cam 7) but just enough to release the latch 32 from its pin 35 and allow it to drop down, influenced by the weight of the wire 34, into the position shown in Fig. 10. As the hundreds hand completes another revolution, adding ten thousand to the units registered, it raises the projection 30 again and this time the units hand carries it up to engage the lower end of the latch 32 which, bearing on the pin 33, lifts the lever 16 sufficiently to throw the pawl 6 to stop the machine.

Another method of adapting the counter to register more than ten thousand units before stopping the machine is shown in Figs. 1, 2 and 8, in which a star-wheel 40 is operated intermittently by the hundreds hand, and through a cam 41 controls the positioning of the projection 25 of the lever 15. The star-wheel 40 is fast on a stud 42 which has a bearing in the dial plate $c$ above the center of the dial and radially in line with the zero point. The periphery of the star-wheel is divided into eight equal spaces and is formed with seven points or teeth, the eighth point being eliminated for a purpose hereafter described. Formed on the hundreds hand $e$ is a projection or lug 43 adapted to engage the teeth of the star-wheel as the hand $e$ passes the zero point in moving around the dial. The points of the star-wheel, as here shown, are numbered— 0, 10, 20, etc., up to 50, so that the counter can be set to register up to fifty thousand, and each rotation of the hundreds hand $e$ moves the star-wheel one tooth in the direction indicated by the arrow 44, thus indicating ten thousand units. Fastened on the stud 42, back of the dial plate $c$ in a recess in the plate $p$, is the cam 41, formed with a portion 45 of its periphery concentric with the periphery of the star-wheel. Formed in this portion of the periphery are notches 46 arranged radially coincident with the points of the star-wheel. Adjacent the point marked "0" the cam has an abrupt rise 47 extending radially outward to the edge 48 which is of greater diameter than that of the portion 45 of the cam's periphery. In the edge 48 is formed an indentation 49 at a point equidistant between the teeth 50 and 51 or radially coincident with the missing tooth of the star-wheel. The projection 25 of the lever 15 is adapted to ride on the periphery of the cam 41, being held in engagement therewith by the weighted end 23 of said lever.

The star-wheel 40 is set manually to indicate the nearest ten thousand to the whole number of units to be registered and the hands $e$ and $f$ are set to indicate, respectively, the hundreds and units. For instance, if it is desired to stop the machine after registering twenty-five thousand-and-fifty revolutions, the star-wheel is set to indicate "20", the hand $e$ at "5000" and the hand $f$ at "50". The operation of the machine turns the hands backward in the direction indicated by the arrow $q$, and each time the hundreds hand moves past the zero point, it turns the star-wheel back one tooth until its zero point coincides with the zero point on the dial. The projection 25 of the lever 15 rides on the edge of the portion 45 of the cam 41 and engages successively the notches 46, etc., to retain the star-wheel in the positions to which it is moved by the hand $e$ and prevent accidental movement through shock or jar. After the star-wheel has been turned to a position with its zero point registering with the zero mark on the dial, as the hand $e$ completes its next rotation and approaches zero again, the projection 43 engages the tooth 52 and moves the cam 41 into the position indicated in Fig. 8. This movement causes the projection 25 to ride up the incline 47 onto the edge 48 and raises it into position to be engaged by the units hand $f$ when the latter reaches zero. The engagement of the hand $f$ with the lever 15 stops the machine as before described.

If it is only required to register one hundred or less operations with the device arranged as just described, the star-wheel can be set with the point 51 at zero. The projection 25 will then engage the notch 53 in the cam 41 and be in position to be acted upon the first time the hand $f$ reaches the zero mark. If the machine is to be stopped after the counter has registered one hundred or less, and this operation is to be repeated several times, it will be manifestly more convenient to have the device act without setting the star-wheel each time. To provide for this is the purpose of eliminating the eighth point on the star-wheel. With the latter set so that the teeth 50 and 51 are equidistant from the zero point on the dial, then the projection 43 on the hand $e$ will clear the teeth so as not to move the wheel. In this position the projection 25 engages the notch or indentation 49 and is in position to be engaged by the hand $f$ as each one hundred or other predetermined less number of units is registered.

To provide for convenience in setting the hands, the following instrumentalities are preferably used: The units hand $f$ is frictionally secured to the stud $d$ against a shoulder $d^2$ by the nut 55, as shown in Fig. 2 or, as illustrated in Figs. 5 and 6, the hand is preferably fastened to a disk or washer 56 secured against the shoulder $d^2$. A washer 58, preferably slightly convex, bears on the disk 56, and its tension is adjusted by the nut 55 to give the required degree of friction to cause the hand $f$ to be turned by the turning of the stud $d$, but allowing it to be turned on the stud when moved manually. The nut 55 is preferably split at 55$^a$ and has a spring friction on the stud $d$ to prevent its working loose. A knob 59 is fastened to the hand $f$ to give a convenient finger-hold, and means are provided to move the hand $e$ from the hand $f$. Preferably a pawl 60 is pivoted at 61 on the disk 56, adapted to be pressed outward by the spring 62 into position to engage the lug 63 on the hand $e$, being limited in movement by a pin 64 in the disk 56 engaging the hole 65 in the pawl—see Figs. 5 and 9. When the hand $f$ is turned in the opposite direction to that indicated by the arrow $q$, the pawl 60 engages the lug 63 and moves the hand $e$ concurrently with the hand $f$. When the hand $f$ is turned in the direction indicated by the arrow $q$ during the operation of the machine, the pawl 60 will be depressed by the lug 63, moving inward against the pressure of its spring and passing freely by the hand $e$. As a further convenience in setting the hands, when it is required to carry them back to the same positions after each operation of the device, I provide a gage 70 shown in Figs. 1 and 2. This is preferably a wire ring 71 sprung into a groove 72 on the inside of the casing $b$, against the face of the dial $c$. The ends 70 and 73 of the wire are bent radially inward and may be grasped by the fingers to pinch the ring together to allow it to be turned freely in its groove. The end 70 is long enough to extend under the end of the hand $f$, and the hand is preferably bent down so that its point just clears the wire. By pressing on the knob 59 as the hand $f$ is turned, the hand is bent inward slightly, as shown by dotted lines, Fig. 2, so that its point will engage the gage 70. The end of the wire or gage 70 is preferably beveled at 74 so that when the hand $f$ is moved in the direction indicated by the arrow $q$, even if it is being pressed down by the fingers, it will ride up over the wire and pass unobstructed. When moved in the direction opposite to that indicated by the arrow, however, and pressed inward by the fingers, the hand will contact with the edge 75 of the wire and stop at the point to which the gage is set.

The operation of the device as a whole used in connection with a winding machine and arranged with the preferable form of mechanism shown in detail in Figs. 5, 6 and 10, is as follows: Assume that it is required to measure fifteen-thousand-five-hundred-and-fifty-one yards and to stop the winding machine when this length has been wound. The operator grasps the knob 59 on the hand $f$ and turns the latter in the direction opposite to that indicated by the arrow $q$ until the pawl 60 engages the lug 63 on the units hand $e$. The hand $e$ can then be turned with and by the hand $f$ and is set to its proper mark, in this instance half way between the " 5000 " and " 6000 " marks, or at 77, Fig. 1, indicating five-thousand-and-five-hundred units. If the same number of operations is to be performed by the machine repeatedly, so that the hand $f$ is to be set at the same mark several times, then, for convenience, the gage 70 is set at the proper units graduation—in this case at one point past " 50 ". The hand $f$ is now turned back in the opposite direction from which it was turned to set the hundreds hand, bringing the point of the hand across the gage 70 and setting it close to the edge 75 which marks fifty-one units, see Fig. 1. If five-thousand-five-hundred-and-fifty-one was the required number of operations to be registered, the machine could now be started, but since the number decided on requires an additional ten thousand units, provision must be made for this additional revolution of the hand $e$. This is accomplished by the simple operation of raising the wire 34 and tripping the latch 32 on its pin 35, Fig. 5. The counter is now set for the full number of operations determined upon. The yarn or other material is wrapped once or twice around the periphery of the measuring wheel $a$, as it passes from the supply to the winding spindle, and the machine is started. As the material is taken up by the winding, or other operation, its linear movement causes the wheel $a$ to rotate and the latter, through the gearing before described, causes the hands $e$ and $f$ to turn backward upon the dial in the direction indicated by the arrow $q$. The projection 26 on the units hand $f$ passes above and free of the projection 30 on the lever 28, but as the two hands coincide at the zero point, after having registered five-thousand-five-hundred-and-fifty-one operations, the projection 30 is lifted on the point of the hand $e$, sufficiently to be engaged and lifted still farther by the projection 26 on the hand $f$. This latter engagement causes the release of the latch 32 which drops down into the position indicated in Fig. 10. After one hundred more revolutions of the units hand are accomplished, the hundreds hand completes another revolution and returns to zero. At this point ten-thousand units have been added to the number registered by the hands upon first passing the " 0 " point or, in other words, fifteen-thousand-five-hundred-and-fifty-one operations are recorded. The hundreds hand now raises the projection 30 into position to be engaged by the projection 26 on the units hand for the second time, and as the latter raises the lever 28, through the latch 32, the arm 16ª of the lever 16 is raised, depressing the wire 17 and rocking the bell crank lever 19. This causes the pawl 6 to be engaged by the cam 7 which rocks the lever 4 and through its arm 4ª lifts the arm $u$ to release the detents of the stopping device and arrest the operation of the machine. At the same time the lever 4 acts to engage the ring 13 to brake the wheel $a$ and prevent its overrunning under influence of momentum. After the winding is completed and the package removed, the machine is prepared to wind again and the counter set as before to repeat the same sequence of operations.

Having now described the preferable form of my device and certain modifications of its mechanism, it will be evident that further changes in arrangement might be made without departing from the scope of the invention. Therefore, I do not limit myself to the exact embodiment shown or to the manner of its application to the machine, for, as before explained, it may be adapted to various forms of mechanisms to register any kind of operations performed thereby.

What I claim is:

1. In a registering and stop-controlling device for a machine, the combination with the stop-control mechanism of the machine, of means to indicate the number of operations performed by the machine, including a stationary dial and hands rotatable about the dial at different rates of movement, and means to cause the action of the stop-control mechanism, controlled by the joint action of the hands.

2. The combination in a registering and stop-controlling device having a dial and hands rotatable about the dial, of a flange surrounding the dial, provided with a groove, and a spring ring engaging the groove and provided with a stop-gage adapted to be engaged by one of the hands.

3. In a registering and stop-controlling device for a machine, the combination with the stop-control mechanism of the machine, of a dial, independent hands rotatable about the dial, means to turn the hands at different rates of movement, and means operative when concurrently engaged by the hands to cause the operation of the stop-control mechanism.

4. The combination in a registering and stop-controlling device with the stop-control mechanism of a machine, of a plurality of indicating hands, means to operate the hands at different rates of movement, and means intermediate the hands and the stop-control mechanism adapted to be engaged first by one hand and then by the other to actuate the stop-control mechanism.

5. The combination in a device of the character described with the stop-control mechanism of a machine of two indicating hands, means to move the hands, and means engaged by one hand to be moved into position to be engaged by the other hand to cause the action of the stop-control device.

6. In a device of the character described, the combination with the stop-control mechanism of a machine, of two indicating hands, means to operate the same, and means to cause the action of the stop-control mechanism when engaged concurrently by both hands after the latter reach a predetermined position.

7. In a device of the character described, the combination with an operating wheel therefor, of indicating hands, means to rotate the same from the wheel at different rates of movement, a brake on the wheel and means to automatically cause the operation of the brake when the hands reach a predetermined position.

8. In a device of the character described, the combination with the stop-control mechanism of a machine, of indicating hands, means to turn the hands, an operating member therefor, a brake connected therewith, and means controlled by the concurrent action of the hands to cause the action of the stop-control mechanism and to set the brake.

9. In a device of the character described, the combination with the stop-control mechanism of a machine, of an indicating hand, means for turning the hand, devices intermediate the hand and the stop-control mechanism to cause the action of the latter, and auxiliary means to carry said devices into position to be operated from the hand after a predetermined number of rotations of the latter.

10. In a device of the character described, the combination with the stop-control mechanism of a machine, of an indicating hand, means for turning the hand, means adapted to be engaged by the hand to cause the operation of the stop-control mechanism, and devices to prevent said means from being operated by the hand but adapted to be released to allow such operation.

11. In a device of the character described, the combination with the stop-control mechanism of a machine, of two indicating hands, means to turn the hands, an operating member to drive said means, and means adapted to be engaged by the hands to connect the operating member with the stop control mechanism to cause the latter to act to stop the machine.

12. In a device of the character described, the combination with the stop-control mechanism of a machine, of indicating members, means to operate the same, and means adapted to be set manually and operated by one of the indicating members to be moved into position to be engaged by the other indicating member to cause the operation of the stop-control mechanism.

13. In a device of the character described, the combination with the stop-control mechanism of a machine, of indicating members, means to operate the same, a lever adapted to be moved to cause the operation of the stop-control mechanism, means connected to said lever for operating the stop-control mechanism, a second lever adapted to be engaged by the indicating members to move the first lever, and means to render the second lever operative, said means adapted to be released by engagement of said lever with the indicating members.

14. In a device of the character described, the combination with the stop-control mechanism of a machine, of indicating members, means to operate the same, a lever to cause the operation of the stop-control mechanism, means connecting said lever with the stop-control mechanism, a second lever operated by the indicating members, and means to engage the second lever with the first, said means adapted to be set manually to be inoperative until released by the indicating members.

15. In a device of the character described, the combination with the stop-control mechanism of the machine, of indicating members, means to operate the same, a lever, means connecting said lever to operate the stop-control mechanism, a second lever engaged by the indicating members, a member on the first lever adapted to be engaged by the second lever, and means to set said member to prevent engagement of the latter by the second lever.

16. In a device of the character described, the combination with the stop-control mechanism of a machine, of indicating members, means to operate the same, a lever, means connected with said lever to cause the operation of the stop-control mechanism, a second lever adapted to be engaged by the indicating members, a latch pivoted on one lever and adapted to be engaged by the other to move the first lever, and means to set said latch to prevent such movement, said latch being adapted to be released by the movement of the second lever.

17. In a device of the character described, the combination with the stop-control mechanism of a machine, of indicating members, means to operate the same, a lever, means connected with said lever to cause the operation of the stop-control mechanism, a second lever moved by the indicating members, a latch on the first lever adapted to be engaged by the second lever to move the first, means to set the latch to prevent such movement, and means on the second lever adapted to be engaged by one of the indicating members to carry it into position to be engaged by the other indicating member to release the latch.

18. In a device of the character described, the combination with the stop-control device of a machine, of indicating members, means to operate the same, a lever, means connecting said lever to cause the operation of the stop-control mechanism, a latch on said lever adapted to be released to allow the operation of the lever from the indicating members and means to set the latch to prevent said operation.

19. In a device of the character described, the combination with the stop-control mechanism of a machine, of indicating members, means to operate the same, a lever having a projection adapted to be engaged by one indicating member to be moved into position to be engaged by the other indicating member and means connecting said lever to cause the operation of the stop-control mechanism.

20. In a device of the character described, the combination with the stop-control mechanism of a machine, of a short indicating hand and a long hand, means adapted to be engaged by the short hand and devices connecting said means to be moved into position to be engaged by the long hand to cause the operation of the stop-control device.

21. In a device of the character described, the combination with the stop-control mechanism of a machine, of registering members, means to operate the same, including a rotating shaft, a cam on said shaft, a lever connected to cause the operation of the stop-control mechanism, a pawl on said lever, and means engaged by the indicating members to cause the engagement of the pawl with the cam to move the lever.

22. In a device of the character described, the combination with the stop-control mechanism of a machine, of indicating members, means to operate the same at different rates of movement, an operating member to drive said means, means adapted to be engaged by the operating member to cause the operation of the stop-control mechanism, and devices operated by the indicating members to cause the engagement of said means with the operating member.

23. In a device of the character described, the combination with the stop-control mechanism of a machine, of indicating members, means to operate the same, an operating member to drive said means, a brake to resist the action of said member, and means connected to actuate the stop-control mechanism and set the brake, said means controlled by the indicating members.

24. The combination in a registering device with driving mechanism therefor having a moving brake flange, of a friction ring engaging said flange and normally moving therewith, and means caused to be operated by the registering device to restrain said ring to arrest the operation of the driving mechanism.

25. In a device of the character described, the combination with indicating members, means to operate the same, and a wheel to drive said means, said wheel having a flange, of a ring frictionally engaging the flange and formed with projections, and means to engage said projections to restrain the ring and arrest the operation of the wheel.

26. In a device of the character described, the combination with the registering means, of a driving mechanism therefor including a wheel, a friction-ring engaging said wheel, a lever adapted to engage said ring, means operated by the turning of said wheel to actuate the lever, and means operated by the registering means to cause operation of said lever-actuating means from the wheel.

27. The combination with the measuring wheel of a registering device, of a friction ring engaging said wheel, a cam operated by the wheel, a lever adapted to engage the ring, a pawl on said lever, and means to engage the pawl with the cam to actuate the lever.

28. In a device of the character described, the combination with the dial, of a gage formed with a stop adjustable on the dial, and a hand rotatable about the dial clear of the stop, and adapted to be pressed down to engage its extremity with the stop.

In testimony whereof I affix my signature in presence of two witnesses.

CARL A. BRINK.

Witnesses:
 CHAS. A. EDDY,
 SUSAN D. BUFFINTON.

Copies of this patent may be obtained for five cents each, by addressing the "Commissioner of Patents, Washington, D. C."